United States Patent
Eavenson, Sr. et al.

(10) Patent No.: US 9,872,438 B2
(45) Date of Patent: Jan. 23, 2018

(54) BATTERY-ELECTRIC AND INTERNAL-COMBUSTION ENGINE ASSIST HYBRID PROPULSION AND IMPLEMENT DRIVE WORK SYSTEMS

(71) Applicant: MTD Products Inc, Valley City, OH (US)

(72) Inventors: Jimmy N. Eavenson, Sr., Aurora, OH (US); Axel Schaedler, North Royalton, OH (US)

(73) Assignee: MTD Products Inc, Valley City, OH (US)

( * ) Notice: Subject to any disclaimer, the term of this patent is extended or adjusted under 35 U.S.C. 154(b) by 166 days.

(21) Appl. No.: 14/216,494

(22) Filed: Mar. 17, 2014

(65) Prior Publication Data

US 2014/0259804 A1    Sep. 18, 2014

Related U.S. Application Data

(60) Provisional application No. 61/800,842, filed on Mar. 15, 2013.

(51) Int. Cl.
*B60W 20/00* (2016.01)
*B60W 10/06* (2006.01)
(Continued)

(52) U.S. Cl.
CPC ........... *A01D 69/025* (2013.01); *A01D 34/78* (2013.01); *A01D 69/02* (2013.01); *B60K 6/42* (2013.01);
(Continued)

(58) Field of Classification Search
CPC combination set(s) only.
See application file for complete search history.

(56) References Cited

U.S. PATENT DOCUMENTS

| | | |
|---|---|---|
| 3,719,881 A | 3/1973 | Shibata et al. |
| 4,768,997 A | 9/1988 | Page et al. |

(Continued)

FOREIGN PATENT DOCUMENTS

| | | |
|---|---|---|
| CA | 2245772 A1 | 8/1997 |
| CZ | 20000940 A3 | 10/2001 |

(Continued)

OTHER PUBLICATIONS

EZGO Textron, Electric and 2-Cycle Gasoline Powered Golf Carts Service Parts Manual, 24566-G1, pp. M-7, M-8, and N-1, Dec. 15, 1990.

(Continued)

*Primary Examiner* — Alicia Torres
(74) *Attorney, Agent, or Firm* — Wegman, Hessler & Vanderburg

(57) ABSTRACT

A lawn maintenance vehicle includes a frame having a first axle and a second axle mounted to the frame. A first drive wheel and a second drive wheel are mounted to the first and second axle. An energy storage device and an electric motor having a motor shaft are mounted to the frame. The electric motor is in electrical communication with the energy storage device and the energy storage device provides electrical power to the electric motor. The lawn maintenance vehicle further includes a traction drive. The traction drive is operably connected to the motor shaft, and the traction drive is operably connected to the first and second axles. The lawn maintenance vehicle includes an implement mounted to the frame. The lawn maintenance vehicle can also include an internal combustion engine operably connected to the electric motor.

6 Claims, 8 Drawing Sheets

(51) Int. Cl.
    *B60W 10/08*    (2006.01)
    *B60K 6/42*    (2007.10)
    *A01D 69/02*    (2006.01)
    *A01D 34/78*    (2006.01)
    *B60L 11/18*    (2006.01)
    *B60K 6/46*    (2007.10)
    *B60K 6/44*    (2007.10)
    *B60K 6/48*    (2007.10)
    *E01H 5/08*    (2006.01)

(52) U.S. Cl.
    CPC ............... *B60K 6/44* (2013.01); *B60K 6/46* (2013.01); *B60K 6/48* (2013.01); *B60L 11/1805* (2013.01); *B60W 10/06* (2013.01); *B60W 10/08* (2013.01); *B60W 20/00* (2013.01); *B60L 2200/40* (2013.01); *B60Y 2200/223* (2013.01); *B60Y 2200/91* (2013.01); *E01H 5/08* (2013.01); *Y02T 10/6221* (2013.01); *Y02T 10/7005* (2013.01); *Y02T 90/16* (2013.01); *Y10S 903/903* (2013.01)

(56) References Cited

U.S. PATENT DOCUMENTS

| | | | |
|---|---|---|---|
| 5,685,387 A | 11/1997 | Rioux et al. | |
| 5,802,824 A * | 9/1998 | Aldrich | A01D 34/001 56/12.7 |
| 6,201,310 B1 | 3/2001 | Adachi et al. | |
| 6,524,217 B1 * | 2/2003 | Murakami | B60K 6/365 180/65.225 |
| 6,591,593 B1 | 7/2003 | Brandon et al. | |
| 6,717,281 B1 * | 4/2004 | Brandon | B60L 11/1807 180/65.245 |
| 6,948,299 B2 * | 9/2005 | Osborne | A01D 34/006 56/10.8 |
| 6,958,549 B2 | 10/2005 | Wakitani et al. | |
| 6,987,328 B2 * | 1/2006 | Osborne | A01D 34/6806 290/1 A |
| 7,011,591 B2 | 3/2006 | Nakamura | |
| 7,350,344 B2 | 4/2008 | Heinz et al. | |
| 7,610,975 B1 | 11/2009 | Gust et al. | |
| 7,677,344 B2 | 3/2010 | Medina et al. | |
| 7,735,592 B2 | 6/2010 | Bellot et al. | |
| 7,741,793 B2 | 6/2010 | Lucas et al. | |
| 8,191,342 B2 * | 6/2012 | Ishii | A01D 34/44 56/11.9 |
| 2002/0173391 A1 * | 11/2002 | Endo | B60K 6/44 474/18 |
| 2006/0107920 A1 | 5/2006 | Serkh et al. | |
| 2006/0122014 A1 * | 6/2006 | Kamdem | F16D 3/02 474/70 |
| 2006/0131085 A1 * | 6/2006 | Tamai | B60K 6/485 180/65.26 |
| 2006/0154763 A1 | 7/2006 | Serkh | |
| 2006/0254565 A1 | 11/2006 | Bottcher et al. | |
| 2008/0223012 A1 * | 9/2008 | Rosa | A01D 69/02 56/11.9 |
| 2008/0234096 A1 * | 9/2008 | Joshi | B60K 6/46 477/3 |
| 2009/0008172 A1 * | 1/2009 | Aldrich, III | B60K 6/485 180/165 |
| 2009/0098976 A1 * | 4/2009 | Usoro | B60K 6/24 477/5 |
| 2009/0197728 A1 * | 8/2009 | Janson | B60K 6/38 475/5 |
| 2009/0255741 A1 * | 10/2009 | Major | B60K 6/48 180/65.22 |
| 2009/0288893 A1 * | 11/2009 | Wyall | B60K 6/26 180/65.22 |
| 2010/0035715 A1 * | 2/2010 | Ortmann | B60K 6/387 475/5 |
| 2010/0071673 A1 | 3/2010 | Prior | |

FOREIGN PATENT DOCUMENTS

| | | |
|---|---|---|
| EP | 1106411 A2 | 6/2001 |
| EP | 1367297 A2 | 12/2003 |
| EP | 1755370 A1 | 2/2007 |
| EP | 1832484 A2 | 9/2007 |
| EP | 1985487 A2 | 10/2008 |
| JP | 2007312637 A | 12/2007 |
| WO | 03084772 A2 | 10/2003 |
| WO | 03088405 A2 | 10/2003 |
| WO | 2006039520 A1 | 4/2006 |
| WO | 2006086412 A2 | 8/2006 |
| WO | 2007108887 A1 | 9/2007 |
| WO | 2008133881 A2 | 11/2008 |
| WO | 2009117574 A1 | 9/2009 |
| WO | 2010046905 A1 | 4/2010 |

OTHER PUBLICATIONS

EZGO, Technician's Repair and Service Manual, 605586, Gasoline Powered Golf Cars, G-13, G-14, J-1, L-2, L-3, and L-11, Jan. 2007.
Presher, "Electric, Hydraulic Hybrids Boost Efficiency in Different Types of Vehicles", Hybrids in Motion, F-4 and F-6, Jun. 2009.

\* cited by examiner

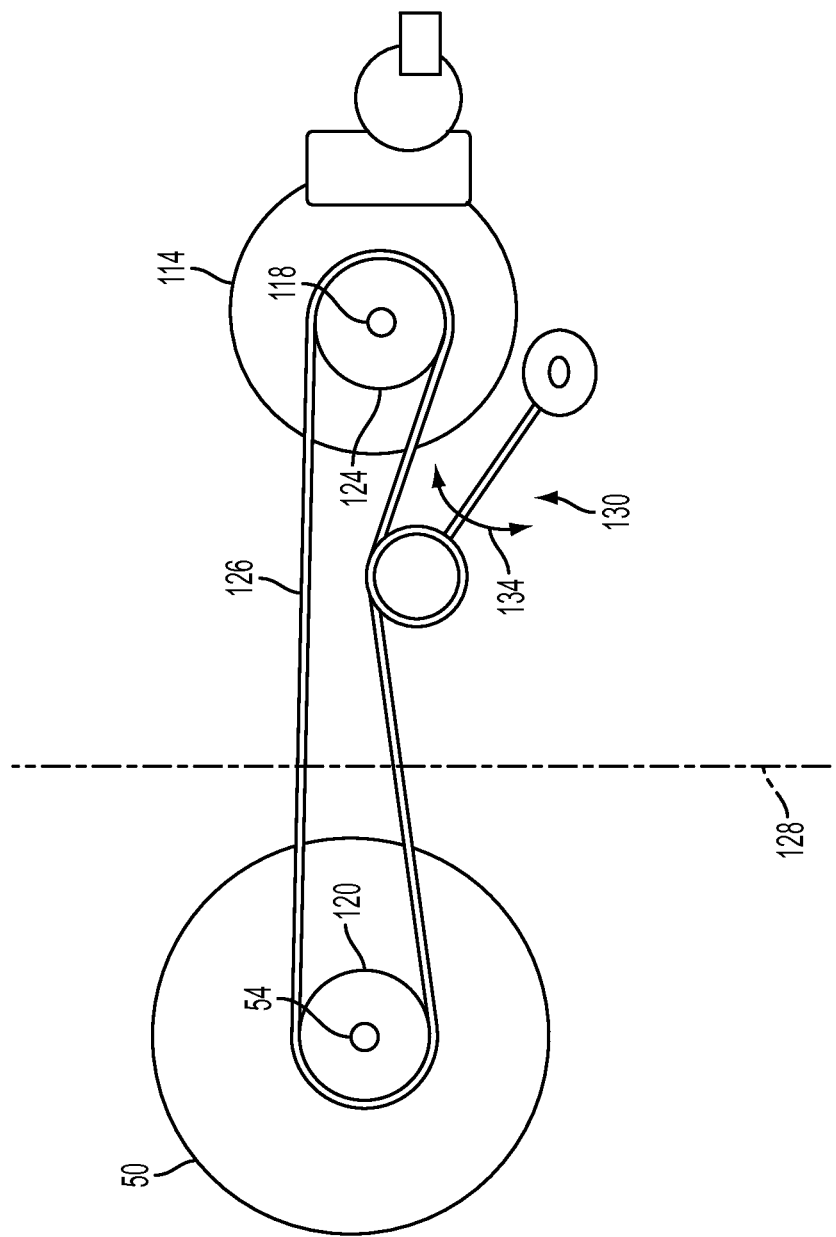

BATTERY-ELECTRIC AND INTERNAL-COMBUSTION ENGINE ASSIST HYBRID PROPULSION AND IMPLEMENT DRIVE WORK SYSTEMS

BACKGROUND

1. Field of the Disclosure

This application relates generally to lawn maintenance vehicles, and more specifically to a lawn maintenance vehicle including an electric motor powering a traction drive device and an implement.

2. Description of Related Art

Currently available lawn maintenance vehicles (e.g., garden tractors or riding mowers) are generally provided with combinations of 1) electric traction and implement drive powered by stored energy devices with multiple electric motors, 2) electric traction drives and mechanical implement drives powered by internal combustion engines coupled to generators/alternators, and 3) mechanical traction drive and electrical implement drives powered by internal combustion engines coupled to generators/alternators (sometimes with batteries).

The above configurations typically require expensive traction and implement drive motors and speed/power controllers. The motors are variable speed which means that they are operated for periods of time at non-optimal efficiencies. Motors sometime directly drive the implement and/or traction drives, which require that they be robust enough to accommodate the shock and strength requirements. The motor controllers consume energy that could be used to extend the operating time/range of the machines. Furthermore, wiring, switching contactors, and connections tend to be complex and expensive. Internal combustion engines coupled to generators/alternators are also relatively expensive, especially when they are of the higher efficiency ranges. They also tend to be heavy (adding to the overall machine mass) which negatively affects energy consumption. Accordingly, improvements to electric lawn maintenance vehicles are desired.

SUMMARY

The following presents a simplified summary in order to provide a basic understanding of some example aspects of the disclosure. This summary is not an extensive overview. Moreover, this summary is not intended to identify critical elements of the disclosure nor delineate the scope of the disclosure. The sole purpose of the summary is to present some concepts in simplified form as a prelude to the more detailed description that is presented later.

According to one aspect, the subject application involves a lawn maintenance vehicle including a frame. The lawn maintenance vehicle also includes a first axle and a second axle mounted to the frame. The lawn maintenance vehicle further includes a first drive wheel and a second drive wheel mounted to the first axle and the second axle. The lawn maintenance vehicle still further includes an energy storage device mounted to the frame. The lawn maintenance vehicle also includes an electric motor mounted to the frame. The electric motor includes a motor shaft. The electric motor is in electrical communication with the energy storage device and the energy storage device provides electrical power to the electric motor. The lawn maintenance vehicle further includes a traction drive mounted to the frame. The traction drive is operably connected to the motor shaft, and the traction drive is operably connected to the first and second axles. The lawn maintenance vehicle still further includes an implement. The implement is mounted to the frame.

According to another aspect, the subject application involves a lawn maintenance vehicle including a frame. The lawn maintenance vehicle also includes a first axle and a second axle mounted to the frame. The lawn maintenance vehicle further includes a first drive wheel and a second drive wheel mounted to the first axle and the second axle. The lawn maintenance vehicle still further includes an energy storage device mounted to the frame. The lawn maintenance vehicle also includes an electric motor mounted to the frame. The electric motor includes a motor shaft. The electric motor is in electrical communication with the energy storage device and the energy storage device provides electrical power to the electric motor. The lawn maintenance vehicle further includes a traction drive mounted to the frame. The traction drive is operably connected to the motor shaft, and the traction drive is operably connected to the first and second axles. The lawn maintenance vehicle still further includes an implement. The implement is mounted to the frame. The lawn maintenance vehicle also includes an internal combustion engine operably connected to the electric motor.

BRIEF DESCRIPTION OF THE DRAWINGS

The foregoing and other aspects of the present disclosure will become apparent to those skilled in the art to which the present disclosure relates upon reading the following description with reference to the accompanying drawings, in which:

FIG. 8 is a schematic bottom view taken along line 8-8 of FIG. 7.

DETAILED DESCRIPTION

Figure 1:
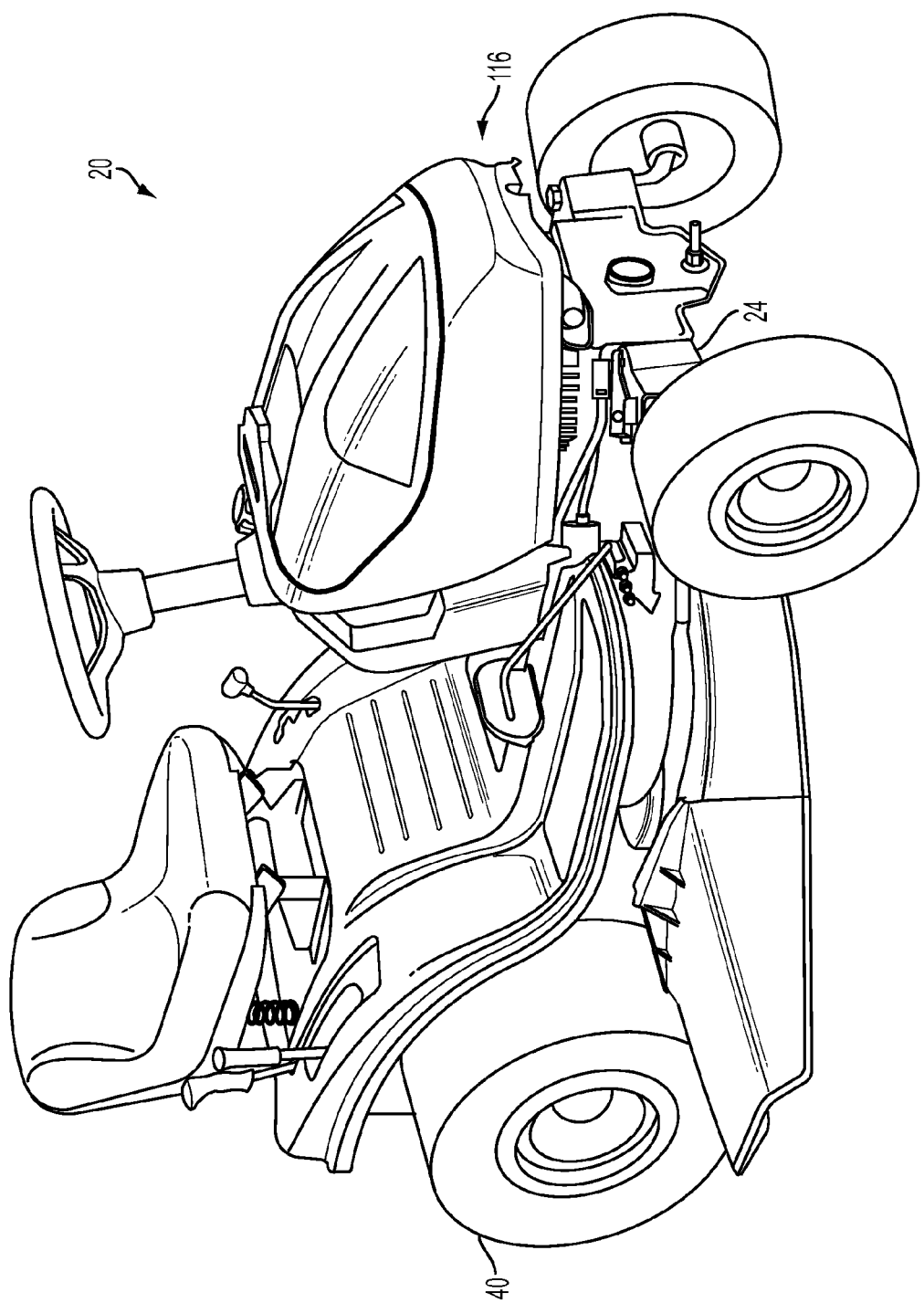
FIG. 1 is a perspective view of a lawn maintenance vehicle in accordance with aspects of the present disclosure.

Example embodiments that incorporate one or more aspects of the present disclosure are described and illustrated in the drawings. These illustrated examples are not intended to be a limitation on the present disclosure. For example, one or more aspects of the present disclosure can be utilized in other embodiments and even other types of devices. Moreover, certain terminology is used herein for convenience only and is not to be taken as a limitation on the present disclosure. Still further, in the drawings, the same reference numerals are employed for designating the same elements.

FIG. 1 shows a perspective view of an example lawn maintenance vehicle 20 according to at least one aspect of the present disclosure. While the shown example lawn maintenance vehicle 20 is a riding mower, and the remainder of the disclosure is primarily directed to a riding mower, it is to be understood that any number of lawn maintenance vehicles are contemplated by the present disclosure. The lawn maintenance vehicle 20 includes a frame 24 which can serve as a platform from which to mount typical components of a lawn maintenance vehicle 20. While only the front portion of the frame 24 can be seen in FIG. 1, the frame 24 can extend toward the rear of the lawn maintenance vehicle 20 for substantially the entire length of the lawn maintenance vehicle 20.

Figure 2:
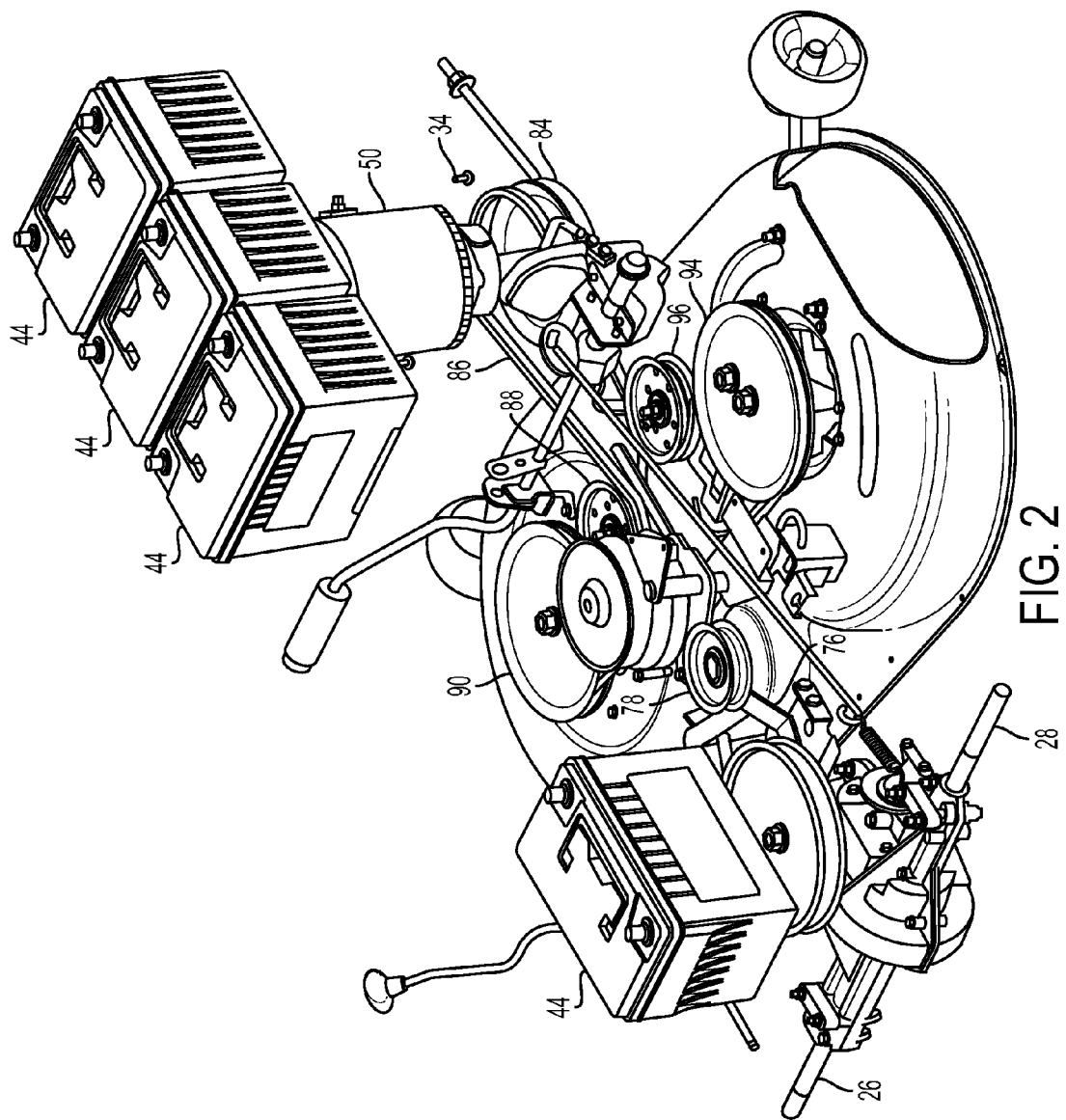
FIG. 2 is a partially-exploded perspective view of some components of the lawn maintenance vehicle of FIG. 1.
Figure 3:
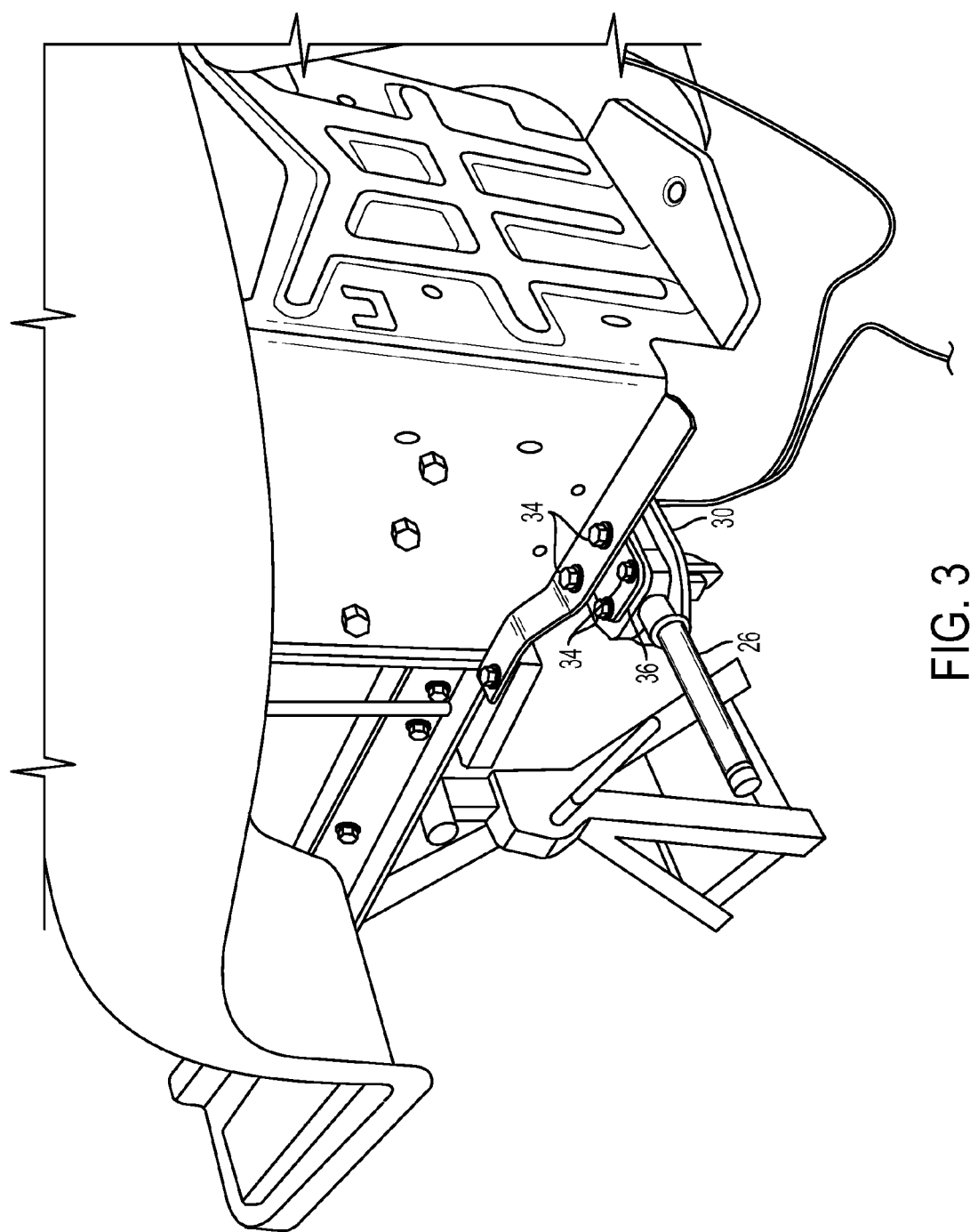
FIG. 3 is a detail view of a first axle from the example lawn maintenance vehicle of FIG. 1.

FIG. 2 shows a perspective view of selected components of one example lawn maintenance vehicle 20 with many of the exterior components and the frame 24 removed for clarity. The lawn maintenance vehicle 20 includes a first axle 26 and a second axle 28 mounted to the frame 24 (not shown in FIG. 2). FIG. 3 shows one example of the first axle 26 mounted to the frame 24. In this example, the first axle 26 passes through a fraction drive 30 configured to be secured to the frame 24 using threaded fasteners 34. A bracket 36 may also be used to mount the traction drive 30 to the frame 24. The example of FIG. 3 is not meant to be limiting, and any suitable structure or method of mounting the first axle 26 and the second axle 28 to the frame 24 are acceptable.

Figure 4:
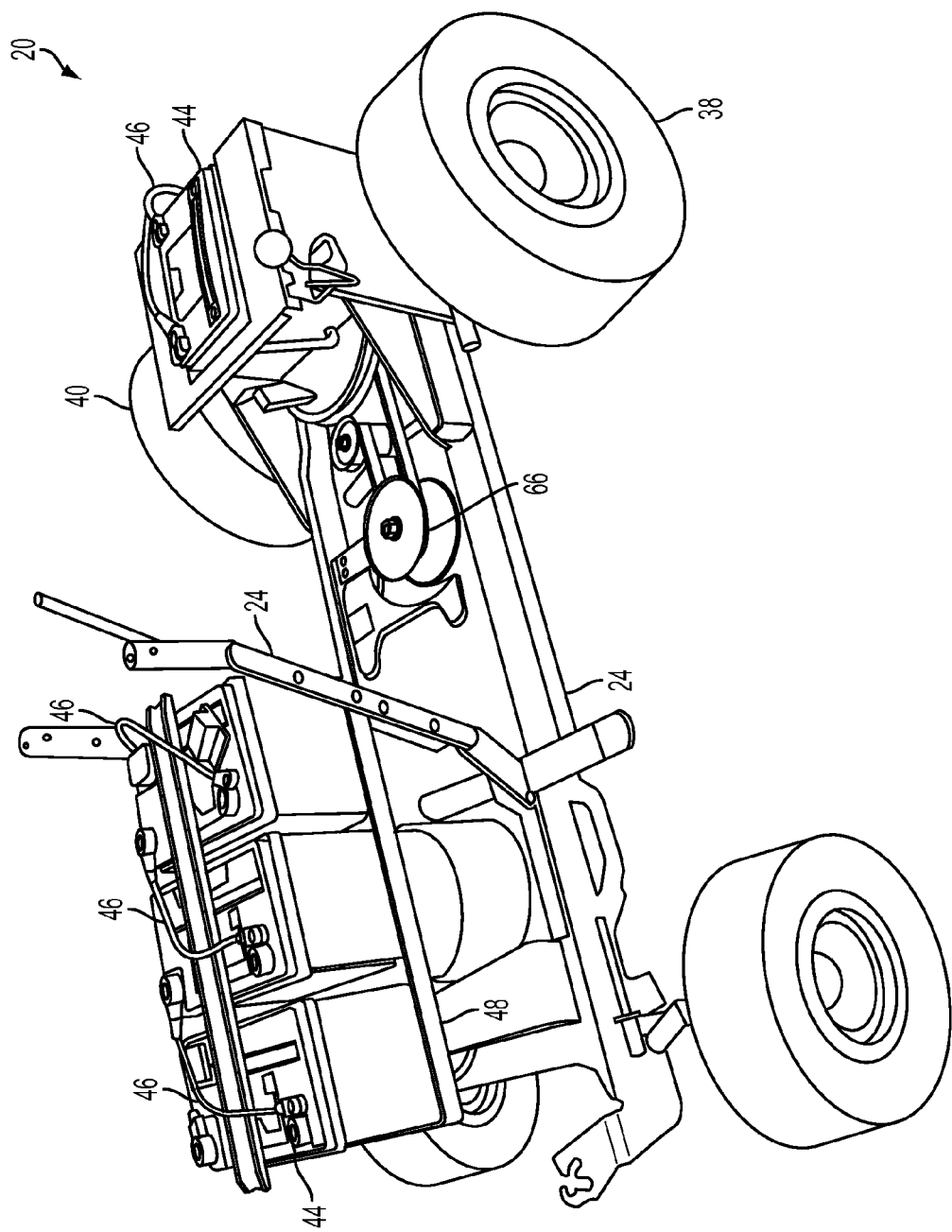
FIG. 4 is a perspective view of the lawn maintenance vehicle of FIG. 1.

As shown in FIGS. 1 and 4, the lawn maintenance vehicle 20 also includes a first drive wheel 38 and a second drive wheel 40. The first drive wheel 38 can be mounted to the first axle 26 while the second drive wheel 40 can be mounted to the second axle 28. In the shown examples, the first drive wheel 38 and the second drive wheel 40 can be the two rear wheels of a riding lawn mower. However, the first drive wheel 38 and the second drive wheel 40 can also be the two front wheels of a four-wheeled lawn maintenance vehicle 20 or two wheels of any other configuration of wheeled lawn maintenance vehicles 20.

Turning to FIG. 4, the lawn maintenance vehicle 20 includes an energy storage device 44 mounted to the frame 24. In the shown example, the energy storage device 44 includes a set of four batteries electrically connected in series by conductors 46. While the examples shown in several of the figures and the remainder of the disclosure describe the energy storage device 44 as one or more batteries, it is to be understood that the energy storage device 44 can include any number of suitable energy storage devices including batteries, capacitors, or fuel cells or combinations of these devices in any combination of types, sizes, and capacities. In one example, the energy storage device 44 can include one or more batteries of the following types: flooded lead-acid, absorbed glass matt, metal-hydride, or lithium ion. Furthermore, the energy storage device 44 can be mounted to the frame 24 in any suitable configuration. In the shown example, batteries are secured to a rack 48 that is mounted to the frame 24.

Figure 5:
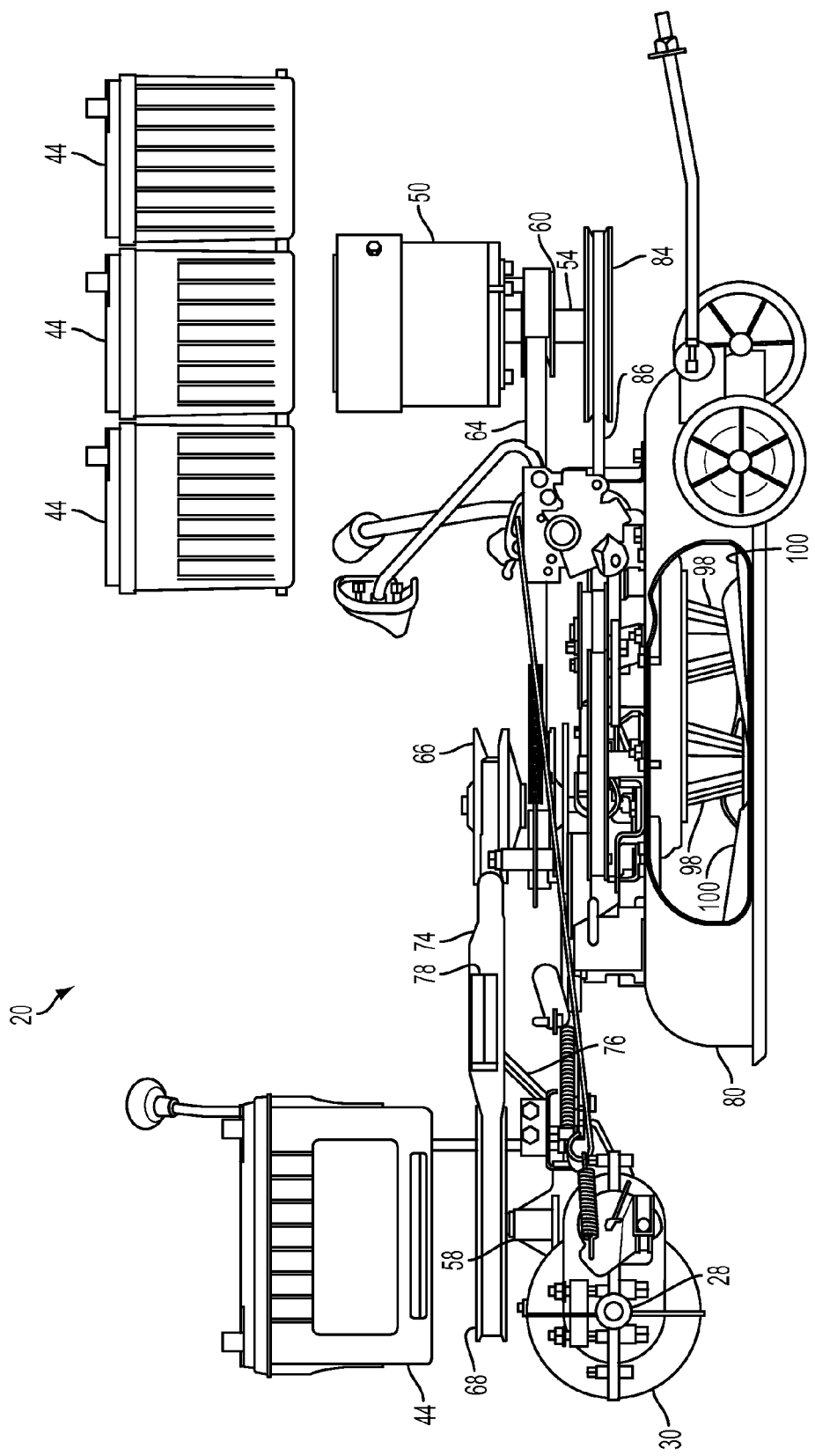
FIG. 5 is a partially-exploded view of some components, similar to FIG. 2.

The lawn maintenance vehicle 20 includes an electric motor 50 which is mounted to the frame 24. In the example shown in FIG. 2, the electric motor 50 is mounted with threaded fasteners 34 to a portion of the frame 24, however, any suitable mounting configuration can be used. Turning to FIG. 5, a side view of selected components of one example lawn maintenance vehicle 20 is shown with many of the exterior components and the frame 24 removed for clarity, similar to FIG. 2. The electric motor 50 includes a motor shaft 54. The electric motor 50 is in electrical communication with the energy storage device 44 such that the energy storage device 44 provides electrical power (e.g., current) to the electric motor 50. The described electrical communication can be conduction of electrical power through a circuit, which is not specifically shown in FIG. 5, but is shown schematically in later figures and is discussed below. Persons having ordinary skill in the art can appreciate that an electrical circuit composed of electrically conductive material can be connected to the electric motor 50 and run between each of the components of the energy storage device 44 and back to the electric motor 50 to provide the electrical communication.

The lawn maintenance vehicle 20 includes the traction drive 30 mounted to the frame 24. A traction drive shaft 58 is rotatably connected to the traction drive 30 which can serve as an input for mechanical power to the traction drive 30. Various mechanisms can serve as a traction drive 30 for the lawn maintenance vehicle 20, including, but not limited to, a continuously variable transmission, a mechanical, multi-speed transmission with a fixed number of gear ratios, a hydrostatic drive, etc. Regardless of the type of traction drive 30, the traction drive 30 can include at least one forward gear, a neutral position, and one reverse gear. As shown in FIG. 2, the traction drive 30 is operably connected to the first axle 26 and the second axle 28. This operable connection enables mechanical power input at the fraction drive shaft 58 to be transferred through the traction drive 30 and output to the first axle 26 and the second axle 28. The speed and direction of the rotation of the input and the output can be altered within the traction drive 30. For example, the traction drive shaft 58 acting as an input can rotate about a substantially vertical axis while the first axle 26 and the second axle 28 acting as outputs can rotate about a substantially horizontal axis. Furthermore, the traction drive 30 can alter the output rotation speed and the output rotation direction of the first and second axles 26, 28 given an input of constant rotation speed and one rotation direction. As such, the traction drive 30 is variable speed and can propel the lawn maintenance vehicle 20 in the forward and reverse travel directions. In another example, the traction drive 30 can include a differential gear apparatus in addition to the structure described above.

Returning to FIG. 5, the traction drive 30 is operably connected to the motor shaft 54 in order to transmit the mechanical power produced by the electric motor 50. Any suitable operable connection between the motor shaft 54 and the traction drive 30 can be used. In one example, a first pulley 60 is mounted to the motor shaft 54, and the first pulley 60 is a V-pulley. As illustrated in FIG. 5, a first belt 64, which can be a V-belt, can engage the first pulley 60 on the motor shaft 54 and engage a variator 66 or a multi-speed transmission located between the electric motor 50 and the traction drive 30. A fraction drive belt 74 can then engage a different portion of the variator 66 and also engage a second pulley 68 mounted on the traction drive shaft 58. The variator 66 can be controlled by an operator of the lawn maintenance vehicle 20 to limit the amount of mechanical power transferred from the electric motor 50 to the traction drive 30. Additionally, the variator 66 can provide an infinite speed range output to the traction drive belt 74 from a constant speed input from the first belt 64. In this described arrangement with a variator 66 located between the electric motor 50 and the traction drive 30, the fraction drive 30 is operably connected to the motor shaft 54 by the first belt 64, the variator 66, and the traction drive belt 74.

In another example, the first belt 64 can operably connect the traction drive 30 to the motor shaft 54 in a more direct way. In this example, a second pulley 68 is mounted to the fraction drive shaft 58, and the second pulley 68 is also a V-pulley. The first belt 64 engages the first pulley 60 and the second pulley 68 to operably connect the motor shaft 54 to the traction drive 30 through the traction drive shaft 58. As previously discussed, the traction drive 30 is operably connected to the first axle 26 and the second axle 28. Because the first axle 26 and the second axle 28 connect the first drive wheel 38 and the second drive wheel 40 to the traction drive 30, mechanical power produced by the electric motor 50 is transferred to the traction drive 30 which rotates the first drive wheel 38 and the second drive wheel 40. In this example, having the first belt 64 engage the first pulley 60 of the motor shaft 54 and the second pulley 68 of the traction drive shaft 58 without having an intermediate variator 66 or multi-speed transmission, the traction drive 30 is typically a mechanical multi-speed transmission.

Additionally, other structures can interact with the first belt 64 or the traction drive belt 74 as one of these belts transmits mechanical power to the traction drive 30. In one example, an engagement device, such as a belt tensioning mechanism 76 is mounted proximally to the belt at a location between the first pulley 60 and the second pulley 68. By engaging the belt, the belt tensioning mechanism 76 regulates the amount of mechanical power transferred from the first pulley 60 to the second pulley 68. In one example, the belt tensioning mechanism 76 can engage either the first belt 64 or the traction drive belt 74 in the space between the electric motor 50 and the traction drive 30. As shown in FIGS. 2 and 5, the belt tensioning mechanism 76 can be an engagement pulley 78 that is rotated about a non-central axis that alters the path of the belt. The belt tensioning mechanism 76 can extend the travel path of the belt, thereby increasing the tension in the belt. Increasing the tension through movement of the belt tensioning mechanism 76 can serve as an engagement of the traction drive 30. In one example, when the belt tensioning mechanism 76 engages the belt and increases the tension in the belt, mechanical power is transferred through the belt to the traction drive 30 which is then engaged. Alternatively, when the belt tensioning mechanism 76 disengages the belt and decreases the tension in the belt, little or no mechanical power is transferred through the belt to the traction drive 30 which is then effectively disengaged. It is to be understood that an infinite range of positions of the belt tensioning mechanism 76 can vary the amount of mechanical power transferred to the traction drive 30 between full transmission of power and no transmission of power.

The lawn maintenance vehicle 20 also includes an implement mounted to the frame 24. While the figures and the remainder of the disclosure describe a spindle driven cutting deck 80 for a riding lawn mower, it is to be understood that any number of implements such as a snow blower, a rotary broom, a power assist material collection mechanism, etc. may be considered an implement. As shown in FIG. 5, a third pulley 84 is mounted to the motor shaft 54, and a second belt 86 engages the third pulley 84 which can be a V-pulley. Returning to FIG. 2, the second belt 86 can engage the third pulley 84 on the motor shaft 54 and take a serpentine path to engage a guide pulley 88 mounted to the implement, two spindle pulleys 90, 94, and another guide pulley 96 before returning to engage the third pulley 84. Through the serpentine path of engagement with the spindle pulleys 90, 94, the second belt 86 transfers mechanical power from the motor shaft 54 to the implement. In the shown example, the two spindle pulleys 90, 94 are mounted to shafts 98 which, in turn, support mower blades 100. The described serpentine path of the second belt 86 and spindle driven cutting deck 80 are merely one example of structure for transfer of mechanical power to an implement and are not meant to be limiting. Any suitable belt path and number and position of pulleys and mower blades 100 are considered. As previously discussed, the second belt 86 can also be used to transfer mechanical power from the motor shaft 54 to any number of other types of implements.

By using belt-driven spindles for the cutting deck 80 in lieu of electric motors with speed controllers for each spindle associated with a mower blade 100, the system becomes more robust at a lower cost with higher efficiencies. Additionally, the speed of the spindle for different mower blade sizes can be controlled by the pulley size mounted to the spindle, without relying upon expensive motors and controllers that must be configured for each mower blade size and speed/power requirement.

Figure 6:
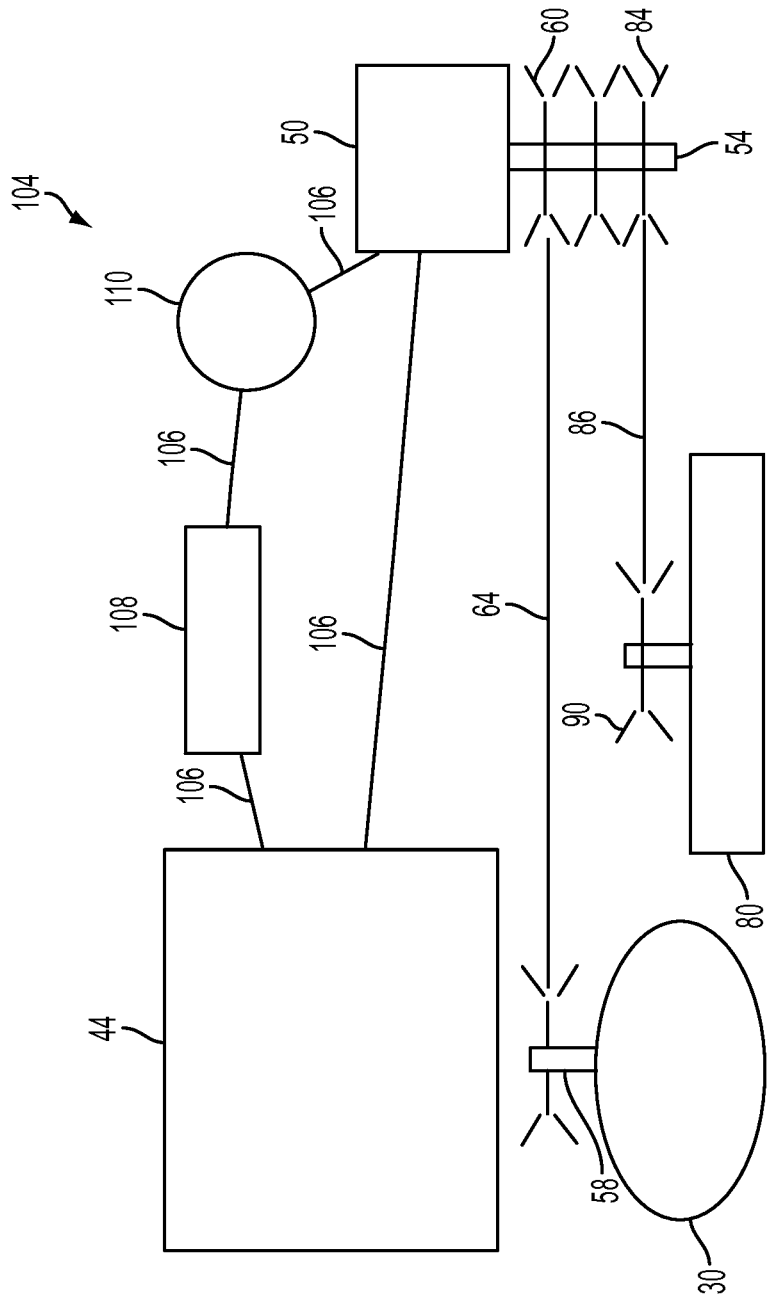
FIG. 6 is a schematic view of a power circuit of the lawn maintenance vehicle of FIG. 1.

Turning to FIG. 6, a schematic representation of some of the lawn maintenance vehicle components is shown. The lawn maintenance vehicle 20 can include a power circuit 104 which includes conductors 106 capable of passing electrical impulses to and from the various components of the power circuit 104. The power circuit 104 also includes a circuit breaker 108 and a key switch 110 in electrical communication with the electric motor 50. The conductors 106 can form an electrical path between the electric motor 50, the key switch 110, the circuit breaker 108, and the energy storage device 44. As can be appreciated, an operator can activate the key switch 110 to complete an electrical path about the power circuit 104, enabling the electric motor 50 to draw power from the energy storage device 44. The electric motor 50 can then be a single source of power for the traction drive 30 and the implement.

In one example, the electric motor 50 can be a brushed direct current (DC) motor. If a brushed DC motor is used, certain efficiencies can be realized. For example, a brushed DC motor does not require a speed/power controller for proper operation. As such the power circuit 104 is devoid of a controller, thereby reducing component cost, design considerations, and assembly time. Another efficiency that can be realized by using a brushed DC motor is the ability to fine-tune the electric motor 50 to a relatively small band of output power. Without the necessity of the speed/power controller, the brushed DC motor can operate like a self-governing internal combustion engine. As the loads from the traction drive 30 and/or the implement become larger, the brushed DC motor will simply draw more power from the energy storage device 44 to continuously produce output within the relatively small band of output power. In other words, if the implement is cutting long, wet grass, forcing the electric motor 50 to operate under a relatively large load, the brushed DC motor will simply draw more current from the energy storage device 44 to maintain speed. In this configuration, the brushed DC motor will be operating at peak efficiency for all or nearly all of its operating time. The electric motor 50 is designed to operate at constant speed—either "ON" or "OFF", without the need for speed and/or power control. In other examples, the electric motor 50 can be a brushless DC motor or an AC motor. While not shown in FIG. 6, the brushless DC motor and the AC motor would require a speed controller and/or a power controller to account for variable speeds.

It is to be understood that the use of a single brushed DC motor to operate the implement and the traction drive 30 can minimize other motor issues as well. For example, as other types of motors approach their maximum load, they tend to lose efficiency and heat up. The operator may have no indication of the overheating, and the motor can even shut itself off due to the high temperatures. However, use of the brushed DC motor enables the lawn maintenance vehicle 20 to continue cutting grass without experiencing motor overheating conditions. The benefits can be more pronounced if each of the mower blades 100 were powered by its own individual motor. In one example, under relatively heavy load, one or more of the mower blades 100 can heat up and operate less efficiently. The mower blade may even experience "stall" wherein the mower blade is not rotating fast enough to properly cut the grass. In this event, the operator is likely unaware of this condition until making the next pass. However, presented with the heavy loading scenario, the brushed DC motor will simply draw more reserve power (current) from the energy storage device 44 and stay in its peak operating range even under high demand.

The arrangement shown in FIG. 6 also enables the electric motor 50 to recharge the energy storage device 44 when the lawn maintenance vehicle 20 is decelerating or descending slopes. For example, while the electric motor 50 is drawing a reduced current load due to the lack of need to power the traction drive 30, the operable connection between the traction drive 30 and the electric motor 50 (e.g. the first belt 64) turns the motor shaft 54, enabling the electric motor 50 to generate a current that is delivered to the energy storage device 44 where it is used to re-charge the energy storage device 44.

In one example, the key switch 110 can be a double-acting, dual-pole solenoid. Turning the key switch 110 to one side activates the solenoid to send current to the electric motor 50 and turn over (start) the electric motor 50. Activating the key switch 110 in the opposite direction can activate the opposite pole located in series with a resistor. This portion of the circuit can brake the load to stop the electric motor 50 in a set time based upon the value of the resistor.

Figure 7:
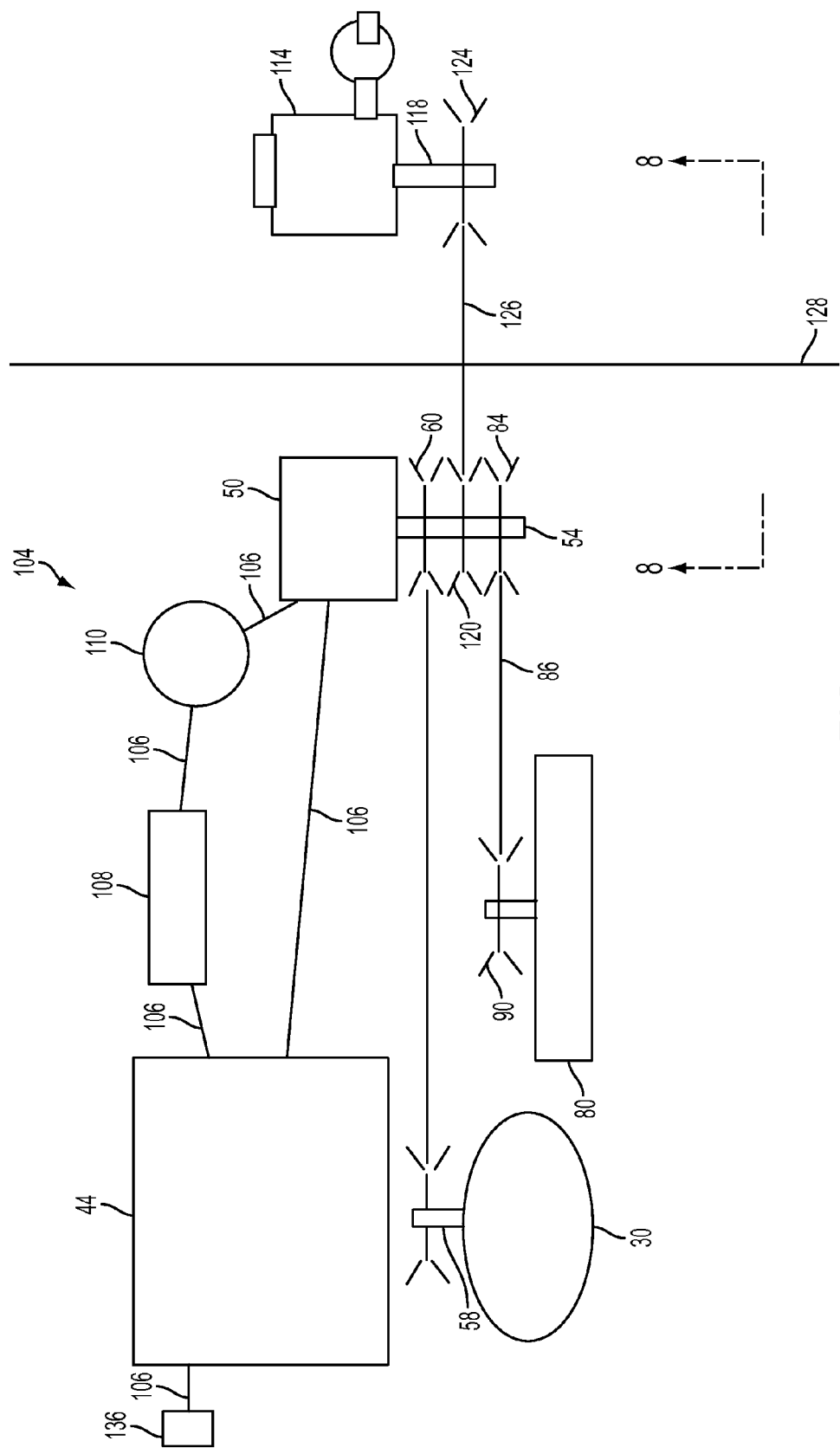
FIG. 7 is a schematic view similar to FIG. 6, including an internal combustion engine.

Turning to FIG. 7, another embodiment of an example lawn maintenance vehicle 20 is shown schematically. The lawn maintenance vehicle 20 includes an internal combustion engine 114 which is operably connected to the electric motor 50. The addition of the internal combustion engine 114 can be offered as a kit for field installation, or installed during initial manufacturing. In one example, the internal combustion engine 114 can be placed at the front of the lawn maintenance vehicle 20 as shown in FIG. 1 by arrow 116. Returning to FIG. 7, the internal combustion engine 114 includes an engine shaft 118 rotatably mounted to the internal combustion engine 114 such that operation of the internal combustion engine 114 rotates the engine shaft 118. A fifth pulley, or motor shaft engine pulley 120, which can be a V-pulley, is mounted to the motor shaft 54. Similarly, a sixth pulley, or engine shaft motor pulley 124, which can be a V-pulley, is mounted to the engine shaft 118. A third belt, or motor-engine belt 126, engages the motor shaft engine pulley 120 and the engine shaft motor pulley 124 to operably connect and transfer mechanical power between the motor shaft 54 and the engine shaft 118. In one example, the electric motor 50 can serve as the starting device for the internal combustion engine 114 thereby saving the expense, complexity and weight of an engine starting system. As shown in FIG. 7, the components on the left side of line 128 form the basis for an electric powered lawn maintenance vehicle 20, while the addition of the components on the right side of line 128 to those on the left side of the line 128 create a hybrid lawn maintenance vehicle 20.

Turning to FIG. 8, in one example, an engine clutch is mounted proximally to the motor-engine belt 126 between the motor shaft engine pulley 120 and the engine shaft motor pulley 124. In one example, manual engagement of the motor-engine belt 126 is accomplished by using an engine clutch such as a tensioning idler 130. The tensioning idler 130 can be selectively controlled by the operator to increase and decrease belt tension as desired. Motion of the tensioning idler 130 in the direction of arrow 134 is indicated in FIG. 8. In this example, the belt tension is zero until the tensioning idler 130 is moved manually by cables, linkages or other devices so as to engage the motor-engine belt 126, increase the length of its travel path, and thereby increase belt tension and to engage the engine. In this example, engaging the engine refers to creating enough tension in the motor-engine belt 126 so that the motor-engine belt 126 engages the motor shaft engine pulley 120 and the engine shaft motor pulley 124 to transfer mechanical power between the motor shaft 54 and the engine shaft 118.

In another example, engagement of the third belt 126 can be performed by an engine clutch such as electromagnetic clutches. In this example, an electro-mechanical clutch is installed onto the internal combustion engine 114, and a spring-loaded idler maintains tension in the third belt 126. The engine clutch engages the internal combustion engine 114 when low power current is applied to the engine clutch.

In a further example, engagement of the third belt 126 can be performed via pneumatic or vacuum engagement clutches and a pulley installed onto the internal combustion engine 114. In this example, tension is zero until the belt idler is moved by pneumatic-or-vacuum devices so as to increase tension in the third belt 126 and thereby engage the engine.

In some instances the lawn maintenance vehicle 20 can use the internal combustion engine 114 in conjunction with the electric components to create a hybrid device for several different purposes. Firstly, the hybrid mode can be used in order to extend the range and/or operating time of the lawn maintenance vehicle 20. In this instance, the internal combustion engine 114 can be operated in conjunction with the electric motor 50 to develop additional power to supplement the electric motor mechanical power delivered to the traction drive 30 and/or the implement. In effect, the electric motor 50 and the internal combustion engine 114 can run in series to power the traction drive 30 and the implement. In one example, the internal combustion engine provides supplemental mechanical power to the motor shaft 54. This provision of power to the motor shaft 54 allows the electric motor 50 to operate at maximum efficiency. For example, under excessive loads, the electric motor 50 may operate at lower efficiency for any number of reasons. In this event, the internal combustion engine 114 can be selectively engaged to transfer mechanical power through the third belt 126 to the motor shaft 54 such that the electric motor 50 can operate at substantially maximum efficiency while drawing less current from the energy storage device 44.

Secondly, in the case of the energy storage device 44 having discharged batteries, the electric motor 50 can be directly driven by the internal combustion engine 114 to operate the fraction drive 30 and the implement. In one example, the internal combustion engine 114 can directly drive the electric motor 50 by the operable connection between the third belt 126, the motor shaft 54 and the engine shaft 118. In this instance, the electric motor 50 is not drawing current from the energy storage device 44, and the internal combustion engine 114 can individually power the machine. In this instance, the energy storage device 44 (e.g., the batteries) can remain connected to the motor, and the internal combustion engine 114 transfers excess mechanical power to the motor shaft 54 to recharge the energy storage device 44. As the internal combustion engine 114 turns the motor shaft 54, thus operating the electric motor 50, current developed at the electric motor 50 is transferred back to the energy storage device 44 through conductors 106.

Thirdly, the hybrid version of lawn maintenance vehicle 20 can be used as a stand-alone power supply. As an example, the electric motor 50 can be used as a generator powered by the internal combustion engine 114, and both AC and DC electrical power can be made available to the operator. In one example, the electric motor 50 acts as an electric generator to provide a voltage output to an electric receptacle 136 (best seen schematically in FIG. 7) on said mower.

As a brief summary, while the internal combustion engine 114 is in operation, it can operate with the electric portion of the lawn maintenance vehicle 20 to operate in one of three ways: 1) there could be a key switch 110 position to disconnect the batteries from the electric motor 50 (internal combustion engine 114 only power), 2) the electric motor 50 remains connected to the batteries so as to provide supplemental power (the case whereby the implement load slows the engine below a particular, predetermined speed) (internal combustion engine 114 and electric motor 50 power), or 3) the electric motor 50 remains connected to the batteries so as to provide generation to recharge the energy storage device 44, and/or to provide power to an external source (the electric motor 50 becomes a generator as the energy in the energy storage device 44 is depleted).

It is to be understood that control of several variables and design aspects can be implemented to improve the efficiency of the lawn maintenance vehicle 20. For example, V-belt design and V-pulley design can be optimized to improve mechanical power transfer between various components of the lawn maintenance vehicle 20. Additionally, various aspects of the lawn maintenance vehicle tires, wheel bearings, wheel camber, wheel toe, cutting deck 80 configuration, mower blade design, etc. can be improved for an overall gain in efficiency in order to optimize the performance of the electric-powered lawn maintenance vehicle 20.

The described combination of components can provide many advantages. The battery-electric lawn maintenance vehicle can provide a single electric motor for traction and implement drives. The described lawn maintenance vehicle can include an electric motor which operates at a constant speed (either "on" or "off") with no speed and/or power controllers necessary which can enable the electric motor to operate at peak efficiency within the peak performance range.

The described lawn maintenance vehicle can be a relatively low-cost product to operate and manufacture due to the system simplicity and the system efficiency. Furthermore, the work system efficiencies can be optimized due to less weight by having fewer components (e.g., no controllers, less wiring), by having a lighter weight (lower capacity) battery system, and by having reduced power consumption due to having no losses from controller or heat management (e.g., cooling fans).

Additional benefits can include battery re-generation when the lawn maintenance vehicle is decelerating and is descending slopes and easy conversion to a hybrid lawn maintenance vehicle by adding an internal combustion engine. The addition of the internal combustion engine can be offered as a kit for field installation, or installed during initial manufacturing. Also, the lawn maintenance vehicle implement and traction drive systems can be powered: 1) solely by the electric motor; 2) solely by the internal combustion engine; or 3) by both the electric motor and the internal combustion engine.

Further, the described lawn maintenance vehicle can power a variety of implements without costly electrical interfaces and speed/power controllers, such as snow blowers, rotary brooms, and power assist material collection. The described lawn maintenance vehicle can accommodate a variety of stored energy device types, sizes and capacities, such as batteries, capacitors, fuel cells.

Additionally, the hybrid version of the lawn maintenance vehicle can be used as a stand-alone power supply. Accordingly, the electric motor can be used as a generator powered by the internal combustion engine to provide both AC and DC electrical power to the operator.

While this invention has been described in conjunction with the specific embodiments described above, it is evident that many alternatives, combinations, modifications and variations are apparent to those skilled in the art. Accordingly, the preferred embodiments of this invention, as set forth above are intended to be illustrative only, and not in a limiting sense. Various changes can be made without departing from the spirit and scope of this invention. Combinations of the above embodiments and other embodiments will be apparent to those of skill in the art upon studying the above description and are intended to be embraced therein. Therefore, the scope of the present invention is defined by the appended claims, and all devices, processes, and methods that come within the meaning of the claims, either literally or by equivalence, are intended to be embraced therein. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A lawn maintenance vehicle comprising:
a frame;
a first axle and a second axle mounted to said frame;
a first drive wheel and a second drive wheel mounted to said first axle and said second axle;
an energy storage device mounted to said frame;
an electric motor mounted to said frame, said electric motor includes a motor shaft, said electric motor is in electrical communication with said energy storage device and said energy storage device provides electrical power to said electric motor;
a traction drive mounted to said frame, said traction drive is operably connected to said motor shaft, and said traction drive is operably connected to said first and second axles;
an implement, said implement is mounted to said frame;
an internal combustion engine mounted to said frame, said internal combustion engine includes an engine shaft;
an operable connection, wherein said operable connection operably connects said internal combustion engine to said electric motor and is configured to transfer mechanical power between said motor shaft and said engine shaft; said engine shaft rotatably mounted to said internal combustion engine;
said operable connection comprising:
a motor shaft engine pulley mounted to said motor shaft, wherein said motor shaft engine pulley is a V-pulley;
an engine shaft motor pulley mounted to said engine shaft, wherein said engine shaft motor pulley is a V-pulley; and
a motor-engine belt engaging said motor shaft engine pulley and said engine shaft motor pulley to operably connect and transfer mechanical power between said motor shaft and said engine shaft, wherein said electric motor operates as a starting motor for said internal combustion engine;
one and only one clutch configured to engage and disengage said implement with said electric motor; and one and only one engine clutch configured to engage and disengage said internal combustion engine with said electric motor,
wherein said electric motor is configured to operate said traction drive and said implement without power provided by said internal combustion engine.

2. The lawn maintenance vehicle of claim 1, wherein said internal combustion engine provides supplemental mechanical power to said motor shaft, thereby allowing said electric motor to operate at maximum efficiency.

3. The lawn maintenance vehicle of claim 1, wherein said electric motor acts as an electric generator to provide a voltage output to an electric receptacle on said lawn maintenance vehicle.

4. The lawn maintenance vehicle of claim 1, wherein said internal combustion engine transfers excess mechanical power to said motor shaft to recharge said energy storage device.

5. The lawn maintenance vehicle of claim 1, wherein said single engine clutch is mounted proximally to said motor-engine belt between said motor shaft engine pulley and said engine shaft motor pulley.

6. A lawn maintenance vehicle comprising:
a frame;
a transmission attached to said frame;
a first axle and a second axle mounted to said frame;
a first drive wheel and a second drive wheel mounted to said first axle and said second axle;
an energy storage device mounted to said frame;
an electric motor mounted to said frame, said electric motor includes a motor shaft, said electric motor is in electrical communication with said energy storage device and said energy storage device provides electrical power to said electric motor;
a traction drive mounted to said frame, said traction drive is operably connected to said motor shaft, and said traction drive is operably connected to said first and second axles;
an implement, said implement is mounted to said frame;
an internal combustion engine mounted to said frame, said internal combustion engine includes an engine shaft;
an operable connection, wherein said operable connection operably connects said internal combustion engine to said electric motor and is configured to transfer mechanical power between said motor shaft and said engine shaft; said engine shaft rotatably mounted to said internal combustion engine;
said operable connection comprising:
a motor shaft engine pulley mounted to said motor shaft, wherein said motor shaft engine pulley is a V-pulley;
an engine shaft motor pulley mounted to said engine shaft, wherein said engine shaft motor pulley is a V-pulley; and
a motor-engine belt engaging said motor shaft engine pulley and said engine shaft motor pulley to operably connect and transfer mechanical power between said motor shaft and said engine shaft, wherein said electric motor operates as a starting motor for said internal combustion engine;
one and only one clutch configured to engage and disengage said transmission with said electric motor; and
one and only one engine clutch configured to engage and disengage said internal combustion engine with said electric motor,
wherein said electric motor is configured to operate said traction drive and said implement without power provided by said internal combustion engine.

* * * * *